United States Patent [19]
Mandorf

[11] Patent Number: 4,735,974
[45] Date of Patent: Apr. 5, 1988

[54] BINDER SYSTEM FOR CASTABLE CERAMICS

[75] Inventor: Victor Mandorf, Olmsted Falls, Ohio

[73] Assignee: Union Carbide Corporation, Danbury, Conn.

[21] Appl. No.: 808,750

[22] Filed: Dec. 13, 1985

[51] Int. Cl.$^4$ .................. C08K 3/14; C08K 3/22; C08L 45/00
[52] U.S. Cl. .................... 523/141; 523/144; 524/786; 524/787; 524/852; 526/270; 501/89; 264/109; 264/122
[58] Field of Search ............... 523/144, 141; 526/270; 524/786, 787, 852; 501/89

[56] References Cited

U.S. PATENT DOCUMENTS

| | | | |
|---|---|---|---|
| 4,361,670 | 11/1982 | Sugama | 524/811 |
| 4,451,577 | 5/1984 | Coss | 523/144 |
| 4,543,373 | 9/1985 | Krawiec | 523/144 |
| 4,543,374 | 9/1985 | Menting | 523/144 |

*Primary Examiner*—C. Warren Ivy
*Attorney, Agent, or Firm*—James L. Sonntag

[57] ABSTRACT

A castable mix formulation for casting ceramic articles which comprises ceramic particles and an organic resin binder composed of furfuryl alcohol and a catalyst consisting essentially of zinc chloride and para toluene sulfonic acid.

11 Claims, No Drawings

BINDER SYSTEM FOR CASTABLE CERAMICS

BACKGROUND OF THE INVENTION

1. Field of the Invention

The present invention relates to an improved binder system for castable ceramics and to an improved method of casting ceramic articles.

In one important aspect, the invention is directed to the casting of refractory ceramic block for lining steel-making furnaces, refractory troughs for molten steel and other similar refractory articles.

As used herein and in the appended claims, the term "ceramic" is intended to mean any material containing refractory metal oxides, carbides, nitrides, etc. which are stable at high temperatures, e.g. above 1000° C. The invention is particularly useful in casting refractory alumina shapes such as furnace lining block, and will be described hereinafter with particular reference to alumina ($Al_2O_3$) as the ceramic material.

Heretofore, castable ceramic articles have been made using aqueous binder systems, such as a calcium aluminate/water system, for example, which form a hydrated gel binder. These aqueous binder systems create serious problems when used to cast many refractory articles such as furnace lining block and the like,. The resulting articles are not stable at high temperatures and readily crack and/or spall.

There is therefore a present need in the art for an improved non-aqueous resin binder system for casting ceramic articles. The improved binder system should be capable of producing a castable resin bonded ceramic mix which can be easily poured into complex shapes, if necessary, and cured at relatively low temperature into a rigid body.

2. Description of the Prior Art

It has already been proposed to employ a catalyzed furfuryl alcohol resin binder system for composite articles. For example, in U.S. Pat. No. 4,474,636 issued to B. R. Bogner on Oct. 2, 1984, there is disclosed a glass fiber reinforced composite article employing a binder system composed of hydroxymethylfurfural and an acid catalyst. The catalysts may be toluene sulfonic acid, aniline hydrochloric salts, phenol sulfonic acid, acid chlorides, sulfonic acid salts, hydrochloric acid, phosphoric acid, maleic acid, zinc chloride and the like.

U.S. Pat. No. 4,479,913 issued to Akerberg et al, on Oct. 30, 1984, discloses an organic binder system for carbon bodies which comprises monomeric furfuryl alcohol and a catalyst. The catalyst may be a weak acid such as phthalic anhydride, maleic anhydride or phosphoric acid. Zinc chloride is also mentioned as a suitable catalyst.

In an article published in Industrial and Engineering Chemistry, Vol. 52., No. 1, January, 1960, pages 57 and 58, the authors Goldstein et al. describe their work with monomeric furfuryl alcohol impregnating solutions for porous materials. They concluded that organic acids such as citric and maleic acid and zinc chloride are attractive catalysts for the furfuryl alcohol resin binder used in these impregnating solutions. The solutions where found to exhibit low viscosity and excellent stability at low temperature.

It has been found, however, that furfuryl alcohol catalyzed by reaction with zinc chloride alone does not produce a suitable binder system for casting ceramic articles. Although the catalyzed solution is stable and can be stored indefinitely, zinc chloride does not act as a wetting agent when used in the limited amounts required for the binder system.

It is also known from U.S. Pat. No. 4,474,636, supra, that toluene sulfonic acid is a suitable catalyst for a furfuryl resin binder used in the fabrication of fiber reinforced composites. This catalyst, however, reacts too spontaneously with furfuryl alcohol and consequently, the binder system has too short a working life to be practical.

SUMMARY OF THE INVENTION

The present invention is directed to an improved organic resin binder system for castable ceramics which comprises, in combination, furfuryl alcohol and a catalyst consisting essentially of zinc chloride and para toluene sulfonic acid (PTSA).

The invention is also directed to an improved method of casting ceramic articles which comprises, in combination, the steps of:

(a) mixing ceramic particles together with an organic resin binder system comprising furfuryl alcohol and a catalyst consisting essentially of zinc chloride and para toluene sulfonic acid (PTSA), in amounts which will produce a fluid, castable ceramic-binder mixture;

(b) casting the so formed ceramic-binder mixture into a desired shape; and (c) curing the shaped mixture at relatively low temperature to produce a rigid, stable, resin bonded ceramic article.

The ceramic-binder mixture used in the method of the present invention contains predominantly ceramic particles, preferably from about 90 to 95 weight percent of the mixture. The binder portion of the mixture may comprise from about 5 to about 8 weight percent monomeric furfuryl alcohol, about 0.25 to about 2 weight percent zinc chloride and from about 0.25 to about 0.50 weight percent para toluene sulfonic acid, based on the total weight of the mixture.

DESCRIPTION OF THE PREFERRED EMBODIMENTS

It has been unexpectedly found in accordance with the present invention that furfuryl alcohol when catalyzed with both zinc chloride and para toluene sulfonic acid (PTSA) provides an ideal organic resin binder system for castable ceramic articles. The resin binder is stable at room temperature and provides sufficient fluidity to enable the mixture to be easily cast into a variety of shapes.

Although PTSA reacts spontaneously with furfuryl alcohol to produce large quantities of heat and decomposition products, it has been found nevertheless that the catalyst can be employed to produce a castable mixture if used in relatively small amounts and provided that the PTSA is not premixed with the furfuryl alcohol prior to blending with the ceramic particles. It is postulated that this stability of the binder results from the fact that the ceramic particles are able to absorb the heat of reaction that develops and thereby prevent any rapid rise in temperature.

Although the present invention can be carried out with a variety of ceramic materials, it finds particular use in casting shaped articles such as furnace lining block, refractory troughs and the like, made from alumina ($Al_2O_3$). Ceramic mix products are commercially available which contain fused $Al_2O_3$ and minor amounts of other ingredients such as sintering fluxes and impurities.

Furfuryl alcohol is a reactive compound which can be resinified by a number of known catalysts. Mineral acids, strong organic acids, Lewis acids and acyl halides are very active catalysts for this purpose. Control of the exothermic reaction is achieved by regulation of catalyst concentration and temperature. The initial and predominant resinification reaction is intramolecular dehydration involving the hydroxyl group and one molecule and the active alpha-hydrogen atom of another molecule. The contribution of this reaction causes high molecular weight condensation products in which furan rings are linked by methylene bridges into a linear chain. Formaldehyde is thermally decomposed during resinification and is usually always found in the reaction mixture. Experimental evidence, however, indicates that formaldehyde can recondense with intermediate products, and is one way by which resin chains become cross-linked. Final cross-linking usually occurs by a mechanism involving nuclear double bonds during the late curing stages. It is during these late stages that the resin becomes rigid and develops a high degree of chemical inertness.

The large number of catalysts that react with furfuryl alcohol as discussed in the Goldstein article, supra, range from an explosive reactivity to indefinite stability at room temperature. The catalysts also range in catalytic efficiency from about 20 to 78 percent resin yield during curing at about 100° C. Of the many catalysts investigated, it was found that furfuryl alcohol catalyzed with zinc chloride exhibits excellent stability and resin yield, i.e. about 72 percent when cured at 100° C.

Para toluene sulfonic acid is considerably more reactive with furfuryl alcohol than zinc chloride at room temperature and also exhibits a resin yield of over 70 percent. It has been found that when the two catalysts (i.e. $ZnCl_2$ and PTSA) are combined, the higher reactivity of the para toluene sulfonic acid with furfuryl alcohol improves resinification by permitting a reduction of both time and temperature, and also permits the reduction of an added metal, e.g., zinc, impurity to the ceramic/resin system. Unlike zinc chloride, however, para toluene sulfonic acid cannot be added directly to furfuryl alcohol and adequate caution must be taken. (At 25° C., a solution of 5% PTSA in furfuryl alcohol reacts spontaneously in minutes producing large quantities of heat and decomposition products).

It is important in the practice of the present invention to employ the PTSA catalyst in relatively small amounts generally not exceeding about 1.0 percent by weight of the total mix (about 5 weight percent of the binder system). Preferably, the PTSA catalyst is employed in amounts ranging from about 0.25 to about 0.50 weight percent of the total mix.

The amount of furfuryl alcohol required to produce the resin binder may vary depending on several factors, e.g., the particular ceramic material employed, its particle size, etc. It has been found however, that adequate bonding of the particles and good strength are achieved in the finished article when the furfuryl alcohol is used in amounts ranging from about 5 to about 8 weight percent of the total mixture.

The zinc chloride catalyst can be added at any time during the blending procedure, i.e., together with the furfuryl alcohol or as a separate solution. Although the amount of zinc chloride catalyst used in the resin binder is not too narrowly critical, it is important to employ enough of the zinc chloride to establish good resin stability and working life. Preferably, the zinc chloride is used in amounts ranging from about 0.25 to about 2 weight percent of the total mixture.

The ceramic particles, e.g. fused $Al_2O_3$, and all ingredients of the binder system are blended for a sufficiently long period of time to assure uniformity of the mix, adequate particle wetting and proper fluidity. The fluidity should be such as to enable the mix to be easily poured during the casting operation.

The blended mixture is cast into molds of the shape of the finished article and then cured at elevated temperature. The curing temperature may range from about 60° C. to about 150° C. The temperature is preferably cycled over this range for periods of from about 60 to 100 hours, depending on size of the particular article.

The following examples serve to further illustrate the practice of the present invention.

EXAMPLE I

Two refractory bricks measuring $9 \times 4\frac{1}{2} \times 1\frac{1}{2}$ inches were made from a castable formulation composed of a fused alumina mix and a binder system comprising furfuryl alcohol and a catalyst composed of zinc chloride (50% $H_2O$ solution) and para toluene sulfonic acid (65% $H_2O$ solution).

The fused alumina mix was obtained from a commercial source identified as LA-294 mix produced by Norton Co. of Worcester, Mass. A screen analysis of this material was made and the material was found to be composed of approximately 67 weight percent fused $Al_2O_3$ and SiC particles in a size range of from about 2 mesh to 100 mesh, the balance being a very finely divided $Al_2O_3$ and SiC flour, 100% through 325 mesh. All screens are Tyler mesh.

The mix formulation had the following composition:
Fused Alumina Mix: 93.06 wt.%
Furfuryl Alcohol: 6.05 wt.%
$ZnCl_2$, 50% solution: 0.46 wt.%
PTSA, 65% solution: 0.43 wt.%

The mix formulation was prepared by first blending the fused alumina mix and furfuryl alcohol and then adding the catalyst, zinc chloride and PTSA, after a sufficient time to assure a uniform mixture. The total catalyst solution concentration was between 12 and 13 wt.% furfuryl alcohol in the resin solution.

The mix formulation prepared above was then cast into Teflon molds. The first brick was cured in a laboratory oven at 80° C. for 24 hours. The second brick was cured at 110° C. for 24 hours. The bricks were removed from the molds and tested. The bricks were contacted with molten iron with no signs of cracking, spalling, or other degradation.

EXAMPLE II

Fifteen refractory bricks of the same size were made from the same mix formulation as described in Example I. The materials for these bricks were mixed as a single batch in a 15-gallon Hobart mixer using the same mix sequence and then cast into wooden molds to form the $9 \times 4\frac{1}{2} \times 1\frac{1}{2}$ inch bricks. All but two of the molds were lined with sheet wax to prevent sticking during curing. The two remaining molds were lined with Vaseline.

Five smaller samples measuring $1 \times 1 \times 6$ inches were made using the same formulation and mix sequence. These samples were prepared for measuring flexural strength.

The curing cycle used for the bricks and samples prepared above was as follows:

18 hours at 70° C.
24 hours at 90° C.
24 hours at 120° C.

After curing, the average density of the fifteen bricks was measured by water immersion and was determined to be 2.96 grams per cubic centimeter. The average resin content was about 4.3% and the average flexural strength of the cured material (based upon the small cast samples) was 2849 psi. One of the cast brick was baked in a coke pack at 650° C. The resin was found to have a coking value of 55%. This showed that in converting the resin bond to coke there was about 1.9% weight loss by gas evolution. This approximates the initial gas evolution that might occur with resin-bonded block in field use as blast furnace run-out through liners.

The fifteen cast brick were subjected to the same test described in Example I and were found to be stable.

EXAMPLE III

Two furnace blocks were made using a mix formulation similar to that employed in Examples I and II. The blocks were made of trapezoidal shape, 18"×24"×(3"×6"), designed for use in a metal/slag trough.

The following mix formulation was used for the first block:

Fused Alumina Mix: 93.57 wt.%
Furfuryl Alcohol: 5.53 wt.%
$ZnCl_2$ (50% solution): 0.46 wt.%
PTSA (65% solution): 0.43 wt.%

The mix formulation was prepared in the same manner as described above i.e., blending the furfuryl alcohol with the fused alumina mix, and was then cast into molds. The large faces of the molds were coated with sheet wax as before to prevent sticking. The ends of the molds were coated with Vaseline.

Since the first batch of mix formulation used to make the 15 test bricks (Example II) was found to be a little too fluid, it was decided to reduce the total liquid content by about 0.5 wt.% from approximately 6.94 to 6.42 wt.%. The material mixed and flowed very well during casting. In addition, six small samples were cast, again about 1×1×6 inches, for strength test. The curing cycle for these blocks and samples was as follows:

48 hours at 65° C.
24 hours at 90° C.
35 hours at 120° C.

Upon removal of the first block from the mold, the block appeared well cured and hard but there was still a noticeable odor of resin. The block was then returned to the oven at 120° C. and curred for an additional 48 hours. After this the odor disappeared.

The block was cast to a depth of 18¾ inches in order to assure that if there was any shrinkage during curing, the necessary 18 inch depth could be obtained by cutting excess off at one end. However, there was no noticeable shrinkage. After curing, the block was cut to a depth of 18 inches. The cut surface of the block showed no large alumina particles. This indicated that there was some settling during curing and that the mix was still more fluid than necessary.

A second block was prepared in the same manner as described above. However, because of the large particles settling which occurred in the first block, the mix formulation was adjusted to reduce the total liquid resin content of the second block by about 0.6 wt.% to about 5.8 wt.%. This mix formulation required greater mixing energy and was more viscous than the composition of the first block. In spite of this, the mix flowed well and was readily castable. Six smaller samples, again 1×1×6 inches, were also made with this modified mix formulation for strength measurements after curing.

The curing cycle for the second block and additional samples was as follows:

24 hours at 65° C.
24 hours at 90° C.
24 hours at 120° C.

After removing the second block from the mold, it was returned to the oven at 120° C. for an additional 24 hours. A ½ inch cut was made in the second block to obtain the 18 inch required depth. The presence of large particles at the cut surface indicated that there was essentially no particle settling during curing.

The finished block weight 228.2 pounds and had a density of 3.22 grams per cubic centimeter, about 201 lbs/ft$^3$. The small cast samples were tested and exhibited a flexural strength of 4800 psi. These samples were twice as strong as the original mix formulation in spite of their lower resin binder content. This is believed due to the result of particle packing and the more efficient use of the binder in the ceramic/resin system.

Table I below summarizes the mix formulations used and the properties of all the brick, test samples and block prepared in the foregoing examples.

TABLE I

| | Test Samples: | | | | | |
|---|---|---|---|---|---|---|
| | First Two Test Bricks, and 15 Subsequent Test Bricks | | First large Cast Block | | Second Large Cast Block | |
| Composition of Castable Mixes | Weight Percent | Volume Percent | Weight Percent | Volume Percent | Weight Percent | Volume Percent |
| Fused Alumina Mix | 93.06 | 80.45 | 93.57 | 81.73 | 94.20 | 83.30 |
| Furfuryl Alcohol | 6.05 | 17.41 | 5.53 | 16.11 | 5.00 | 14.73 |
| PTSA, 65 w/o in H$_2$O | 0.43 | 1.17 | 0.43 | 1.19 | 0.39 | 1.08 |
| ZnCl$_2$, 50 w/o in H$_2$O | 0.46 | 0.97 | 0.46 | 0.97 | 0.41 | 0.89 |
| Total Liquid, | | | | | | |
| w/o | 6.94 | | 6.42 | | 5.80 | |
| Vol. %* | 19.55 | | 18.27 | | 16.70 | |
| Density, gms/cc | | | | | | |
| as-cast | 3.23 (calc.) | | 3.27 (calc.) | | 3.30 (calc.) | |
| cured @ 120° C. | 2.96 (measured avg. of 15) | | 3.18 (measured) | | 3.22 (measured) | |
| Resinification, %, @ 120° C. | 72 | | 75 | | 75 | |
| Coking Value, %, @ 650° C. | 55 | | 56 | | — | |
| Flex. Str., psi @ 25° C. | | | | | | |

TABLE I-continued

| Composition of Castable Mixes | Test Samples: | | | | | |
|---|---|---|---|---|---|---|
| | First Two Test Bricks, and 15 Subsequent Test Bricks | | First large Cast Block | | Second Large Cast Block | |
| | Weight Percent | Volume Percent | Weight Percent | Volume Percent | Weight Percent | Volume Percent |
| Avg. | 28 | 49 | — | | 48 | 17 |
| Range | 34–19 | 20–07 | — | | 50–44 | 44–44 |

*The values of volume percent were calculated from the values of weight and real density of the individual components: Ceramic Particles, 3.74 gms/cc; furfuryl alcohol, 1.123; $ZnCl_2$ soln., 1.549; and PTSA soln., 1.183. All values were measured at 25° C.

What is claimed is:

1. A castable ceramic-resin binder mix formulation comprising, in combination: ceramic particles uniformly blended together with a resin binder composed of furfuryl alcohol and a catalyst consisting essentially of zinc chloride and para toluene sulfonic acid, in amounts which will produce a fluid, castable mixture, with the ceramic particles being blended together with the furfuryl alcohol component of the binder system before addition of the para toluene sulfonic acid.

2. A castable ceramic-binder mix formulation according to claim 1 wherein the ceramic particles comprise from about 90 to 95 weight percent of the mixture.

3. The castable ceramic-binder mix formulation according to claim 2 wherein the resin binder comprises from about 5 to about 8 weight percent monomeric furfuryl alcohol, about 0.25 to about 2.0 weight percent zinc chloride and from about 0.25 to about 0.50 weight percent para toluene sulfonic acid, based on the total weight of the mixture.

4. The castable ceramic-binder mix formulation according to claim 2 wherein the ceramic particles are of a size ranging from about 2 mesh to less than about 325 mesh.

5. The castable ceramic-binder mix of claim 1 wherein the concentration of the para toluene sulfonic acid does not exceed about 1 weight percent of the total mix.

6. The castable ceramic-binder mix of claim 2 wherein the concentration of the para toluene sulfonic acid does not exceed about 1 weight percent of the total mix.

7. The castable ceramic-binder mix of claim 1 wherein the ceramic particles comprise predominantly finely divided fused $Al_2O_3$ and SiC.

8. The castable ceramic-binder mix of claim 7 wherein the fused $Al_2O_3$ and SiC particles comprise from about 90 to 95 weight percent of the mix.

9. The castable ceramic-binder mix of claim 1 wherein the size of the ceramic particles is less than about 2 mesh (Tyler Standard Sieve Series).

10. The castable ceramic-binder mix of claim 9 wherein 67 weight percent of the ceramic particles are between about 2 mesh and about 100 mesh (Tyler Standard Sieve Series).

11. The castable ceramic-binder mix of claim 9 wherein the ceramic particles comprise predominantly finely divided fused $Al_2O_3$ and SiC.

* * * * *

UNITED STATES PATENT AND TRADEMARK OFFICE
CERTIFICATE OF CORRECTION

PATENT NO. : 4,735,974
DATED : April 5, 1988
INVENTOR(S) : Victor Mandorf

It is certified that error appears in the above-identified patent and that said Letters Patent is hereby corrected as shown below:

Column 4, line 29 - "LA-294" should read ---LA-924---

Signed and Sealed this

Twenty-ninth Day of August, 1989

Attest:

DONALD J. QUIGG

Attesting Officer

Commissioner of Patents and Trademarks